H. C. LUBARSKY.

METHOD AND MEANS FOR DYEING FUR SKINS.

APPLICATION FILED OCT. 5, 1918.

Reissued Sept. 23, 1919.

14,729.

2 SHEETS—SHEET 1.

Inventor:

Harry C. Lubarsky,

By Russell M. Everett, Attorney.

H. C. LUBARSKY.

METHOD AND MEANS FOR DYEING FUR SKINS.

APPLICATION FILED OCT. 5, 1918.

Reissued Sept. 23, 1919.

14,729.

2 SHEETS—SHEET 2.

Inventor:

Harry C. Lubarsky,

By Russell M. Everett, Attorney.

UNITED STATES PATENT OFFICE.

HARRY C. LUBARSKY, OF PHILADELPHIA, PENNSYLVANIA, ASSIGNOR TO A. HOLLANDER & SON, OF NEWARK, NEW JERSEY, A FIRM.

METHOD AND MEANS FOR DYEING FUR-SKINS.

14,729. Specification of Reissued Letters Patent. Reissued Sept. 23, 1919.

Original No. 1,225,447, dated May 8, 1917, Serial No. 123,879, filed October 5, 1916. Application for reissue filed October 5, 1918. Serial No. 257,385.

*To all whom it may concern:*

Be it known that I, HARRY C. LUBARSKY, a citizen of the United States, and resident of Philadelphia, county of Philadelphia, and State of Pennsylvania, have invented an Improvement in Methods and Means for Dyeing Fur-Skins, of which the following is a specification.

The object of my invention is to provide an efficient method and means for dyeing fur skins in a rapid and uniform manner, with a minimum cost for material and labor.

With the stated object in view, my invention consists in supporting the furs upon an endless traveling carrier, subjecting them to a suitable brushing of the fur with dye liquor or material during their travel under a dye applying brush or brushes, and finally conveying both the carrier surface and dyed skins into a drying chamber where the moisture is driven off and removed, the skins being discharged from the carrier and the latter in a dried condition returned to the initial position to receive additional skins to be dyed, whereby the body or leather portions may be unacted upon by wet dye, and the dye applied to the hair of the skins is rubbed well in and upon the outer or end portions thereof and to such extent inwardly, as may be desired, the brushing being in the direction from the roots outward to the hair tips.

My invention further consists in special features of the method and means which, together with those above stated, will be better understood by reference to the drawings, in which:—

Figure 1:
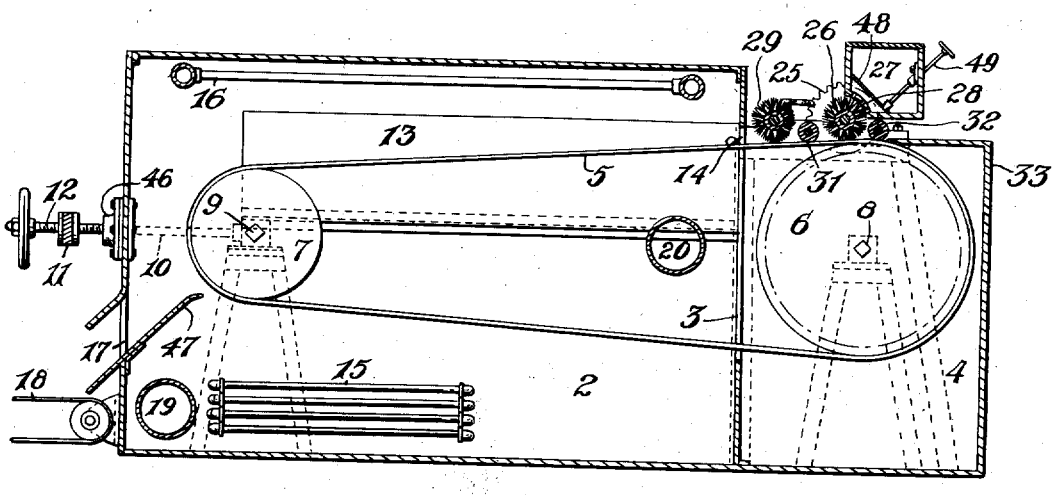
Figure 1 is a sectional elevation of an apparatus embodying my invention and in which my improved method of dyeing may be effected, the said sectional view being taken on line 1—1 of Fig. 2.

2 is the drying chamber and is provided at one end with an opening 3 leading into a secondary chamber 4, and through which the endless carrier belt 5 travels. This belt 5 may be of any suitable material or construction and passes about a large driven drum 6 within the chamber 4 and a smaller drum 7 within the chamber 2 and located at its rear portion. The large drum 6 is journaled in fixed bearings 8, whereas the smaller drum 7 is journaled in adjustable bearings 9, so that said drums may be moved apart to stretch the endless belt carrier 5. The means I prefer to make the adjustment comprises the cross bar 11, rods 10 from the ends of said bar to the respective boxes 9, and an adjusting screw 12 screwed through the bar and having its end abutting a plate 46 on the end of the chamber 2. At each side of the upper layer of the belt 5, I provide a guide board 13 to prevent the skins from sliding sidewise off the carrier. At the end of the chamber 2, where the upper part of the belt carrier enters, there is a shallow opening 14, just sufficient for the skins to freely pass into the chamber.

The chamber 2 is provided with means for heating it and for exhausting the moist air therefrom. The heating means comprise the steam heated coils 15 near the bottom and rear portion, and steam coils 16 arranged near the roof of the chamber. At the rear of the chamber and transversely thereof is a discharge passage 17 through which the skins may be conveyed from the carrier 5 to and upon a conveyer 18 to transport them to the place where they are to be received for finishing. As shown, the discharge passage 17 has an internal inclined guide 47 extending close to the belt carrier 5 at the rear of the drum 7, so as to directly receive the skins as they are delivered from the belt carrier. The chamber 2 is further shown as provided with an inlet for air at 19, but this is not essential in view of the presence of the discharge opening 17 which will permit the entrance of air; however, the opening 19 delivers the air close to the heating coils 15 and below the belt carrier, and hence in a better condition and position for the purpose of drying the belt carrier before it leaves the chamber 2. The moist air from the chamber is withdrawn through the outlet 20 leading to the suction of an exhaust fan 21, which may be driven by belt 22 from the shaft 8 of the drum 6, or otherwise, as desired. It will be noted that the outlet 20 comprises a tube extending into the middle of the chamber 2 and between the upper and lower portions of the carrier 5, so as to cause the heated air to traverse the belt surface and thoroughly dry it of any dye before it emerges for receiving fresh skins to be dyed. It is essential that the belt carrier 5 shall be dry before acting as a support for the skins while being dyed; and while it is desirable to dry the skins to a reasonable extent, it is not necessary that they shall be wholly dried within the chamber 2, as they may be further dried while on the conveyer 18 and in subsequent treatment. In fact it is more desirable that the drying of the dye on the fur shall be done relatively slowly rather than rapidly, so that the dye may penetrate the hair more uniformly, and especially so when the dye liquor is only brushed upon and rubbed into the fur of the skin in the quantity required and not upon the leather or body portion.

I will now describe the means preferred for applying the dye liquor or material. The skins are laid upon the table 33 in front of the receiving end of the belt carrier 5, where it passes about the top of the drum 6, and are guided in succession between the carrier 5 and roller 32 which turns back the fur and exposes the full length of the hair from the roots outwardly. The fur is next acted upon by the dye applying brush 26, which is a strong bristle brush for brushing the dye material upon and into the hair portion. As this brush rotates in the direction contrary to the drum 6, its under side brushes the hair of the skin in the direction of its travel, but at a greater surface speed. The dye is thus applied to and then brushed along the hairs as they are successively released by the drag roll 32. In this way all of the hair of the skin has the dye intimately applied in an effective manner. The dye may be supplied to the brush in any suitable manner, and by way of example I have shown a dye tank 27 with a curved bottom portion provided with fine perforations 28 through which the dye liquor or material passes in regulated quantities to the bristles of the brush 26. The tank 27 may have a partition 48 above the perforated part 28 and the dye admitted through the partition by a regulating valve 49. Any other manner of supplying the dye liquor to the brush may be employed, if so desired. The brush 26 is driven by a pinion 25 meshing with a large gear 23 on the shaft of the drum 6, but it is manifest that the special means for rotating the brush is immaterial to the essence of the invention. The drum 6 and entire machine may be driven by power applying driving means 24 engaging the gear 23 of the drum, if so desired.

Figure 2:
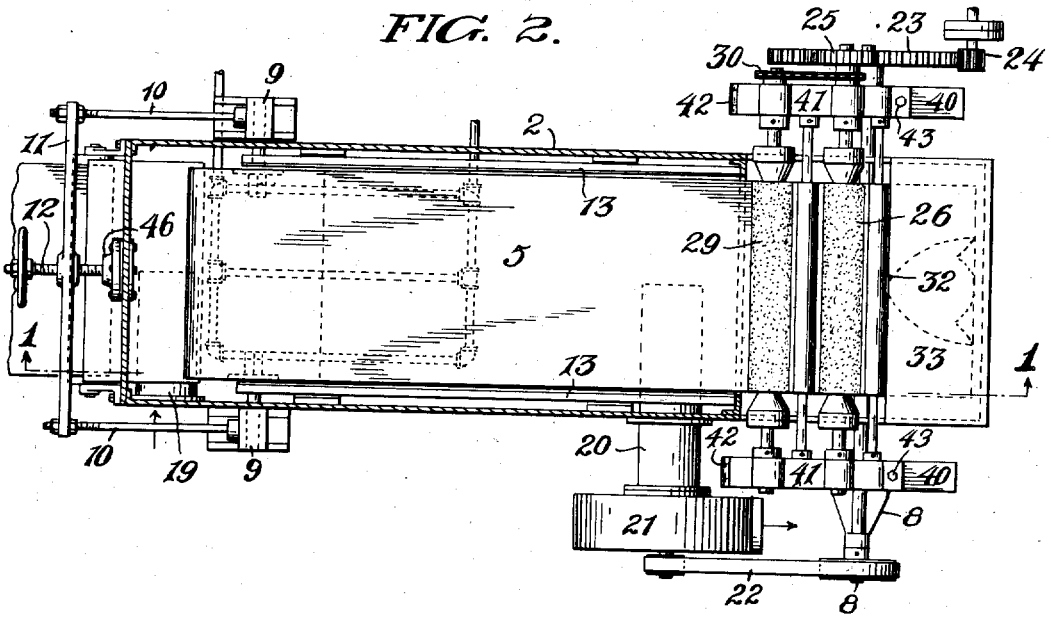
Fig. 2 is a sectional plan view, the top of the closed drying chamber being removed to show the interior construction.

To insure the more uniform application of the dye to the hair or fur of the skins, I prefer to employ a second brush 29 and drag roller 31 to treat the skins immediately after the first dyeing operation, and these I arrange between the brush 26 and the entrance 14 to the chamber 2, as clearly shown in Fig. 1. The secondary brush 29 is not required to be supplied with dye liquor, as its function is to rub in and distribute more thoroughly the dye which has been applied by the brush 26. The drag roller 31 acts as in the case of the roller 32, in holding back the hair to expose the side surface of the hair down to the roots thereof. This brush 29 may therefore be considered as a finishing brush and may be run at any speed desired. As shown, it is driven by chain drive from the brush 26, but I do not restrict myself in this respect. If desired, the finishing brush may be in two parts as shown in Fig. 3 at 50, they being geared together at 34 and driven by miter gears 35 and 37 and shaft 36, in place of the chain drive 30 shown in Fig. 2.

In view of the fact that the dye is applied in a positive and forceful manner, the consistency of the dye liquor may be that found most suitable to the process and the particular skins being treated, and I in no way limit myself by the term "dye liquor" to the extent of fluidity or viscosity; but in any case, no more of the dye is to be applied than is required for thorough dyeing of the skins, and the supply of the dye material to the applying brush 26 would be governed accordingly.

By employing only sufficient dye for the requirement, there is economy in material and the subsequent drying of the skins is more speedily done than where they are dipped and subsequently washed. It will be understood that, while I have shown only the employment of a limited number of brushes, more may be employed if so desired in cases where the skins are more difficult to dye, and I therefore may employ any number of brushes found desirable.

Figure 3:
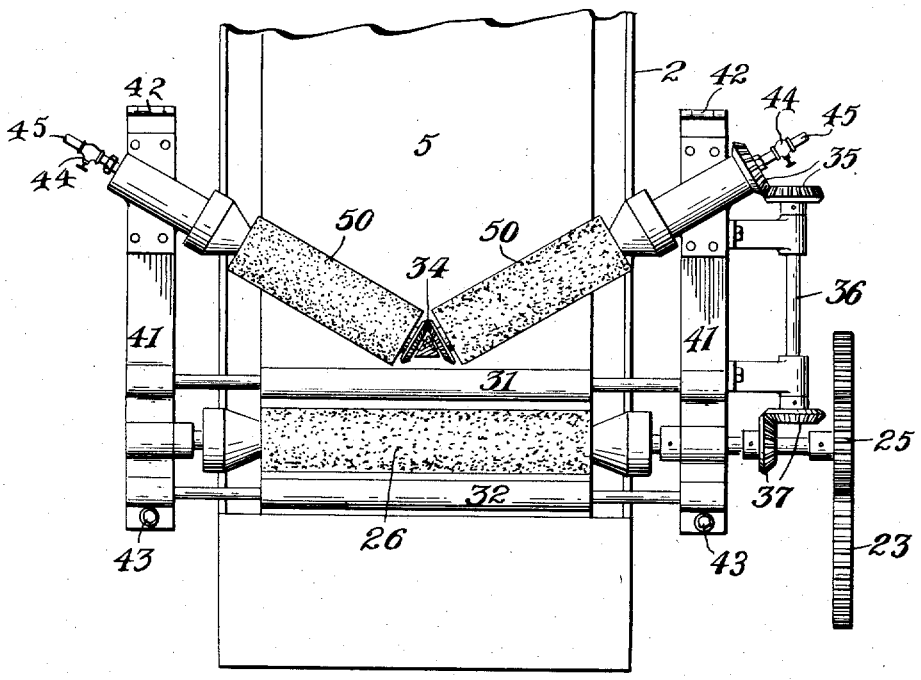
Fig. 3 is a plan view showing a modification of the dye applying means.
Figure 4:
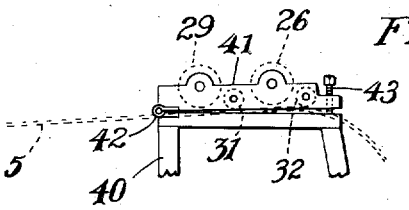
Fig. 4 is an elevation of adjusting means.

In Fig. 3, I have shown pipes 45 to supply dye liquor to the shafts of the brushes 50, said pipes provided with valves 44 to regulate the flow. This, however, is only in case a second application of dye is required or desirable upon the hair. In this manner the extent of dye application can be governed, and as I do not restrict myself to any number of brushes, any density of dyeing desired may be had.

As it is desirable to adjust the brushes to and from the carrier 5 to govern the extent of application of the dye along the length of the hair, I have shown means for accomplishing this purpose. The brushes 26 and 29 are, together with the drag rollers 31 and 32, journaled upon frames 41 hinged at 42 to the main frame 40 and adjustable vertically by screws 43. The hinges 42 are at one end of the frames 41 and the adjusting screws are at the other end, and by adjusting the latter the frames 41 may be positioned higher or lower to similarly adjust the brushes to a greater or less distance from the belt conveyer 5, so that they may apply the dye to a less or greater extent upon the length of the hair.

In some kinds of skins it is desirable to have the dye upon the hair extend only part way in toward the leather body, such as those intended to imitate seal, for example while in other cases it is desirable to dye not only the hair but the hair side of the skin itself, and these results are secured by proper adjustment of the frames 41, as above described.

It will be understood that the skins do not fully cover the surface of the belt carrier 5, and consequently the dye applying brush 26 may under some conditions of operation apply dye liquor to the surface of the carrier as well as to the skin; and if this application of the wet dye to the carrier be not nullified before the surface again receives a skin, the said skin would be injured upon its under or flesh side by splotchy dyeing. To prevent this, the surface of the endless belt carrier is thoroughly dried in its travel through the drying chamber 2, and hence returns to its initial receiving position at table 33 in a dry condition. If desired, the carrier may be washed from time to time to remove any excess accumulations of dye material, should such occur in objectionable quantity.

I have now described my improved apparatus and method by use thereof, for the purpose of dyeing fur skins in a speedy, economical and efficient manner, and while I prefer the same, I do not restrict myself to the minor details, as these may be changed or modified without departing from the spirit or scope of the invention.

Having now described my invention, what I claim as new and desire to secure by Letters Patent, is:—

1. The hereindescribed method of dyeing fur skins, which consists in laying the skins fur side up upon a traveling carrier, brushing into the hair of the skins a dye material, transferring the carrier and skins into a drying atmosphere, discharging the dyed skins, returning the carrier in a dried condition to the initial position and repeating the operation.

2. The hereindescribed method of dyeing fur skins, which consists in laying the skins fur side up upon a traveling carrier, successively pressing back the hair of the skins to expose the sides of the hairs as the skins are conveyed by the carrier, brushing upon the exposed hairs at their free ends alone and at a distance from the skin surface a dye material, transferring the carrier and skins into a drying atmosphere, discharging the dyed skins, returning the carrier in a dried condition to the initial position and repeating the operation.

3. The hereindescribed method of dyeing fur skins, which consists in laying the skins fur side up upon a traveling carrier, brushing into the hair of the skins a dye material, thoroughly distributing the dye applied by the brushing operation by a second brushing operation, transferring the carrier and skins into a drying atmosphere, discharging the dyed skins, returning the carrier in a dried condition to the initial position and repeating the operation.

4. The hereindescribed method of dyeing fur skins, which consists in laying the skins fur side up upon a traveling carrier, successively pressing back the hair of the skins to expose the sides of the hairs as the skins are conveyed by the carrier, brushing upon the exposed hair at their free ends alone and at a distance from the skin surface a dye material, thoroughly distributing the dye applied by the brushing operation by a second brushing operation, transferring the carrier and skins into a drying atmosphere, discharging the dyed skins, returning the carrier in a dried condition to the initial position and repeating the operation.

5. In dyeing apparatus, the combination of a drying chamber, an endless belt carrier guided through the chamber and guided to a point outside the same, a rotating dye applying brush arranged transversely of the carrier outside of the drying chamber, and means for supplying the brush with a dye material whereby it may be applied to skins conveyed by the carrier under the brush, and means for heating and drying the carrier surface before returning to position under the brush.

6. In dyeing apparatus, the combination of a drying chamber, an endless belt carrier guided through the chamber and guided to a point outside the same, a rotating dye applying brush arranged transversely of the carrier outside of the drying chamber, means for supplying the brush with a dye material whereby it may be applied to skins conveyed by the carrier under the brush, a drag roll parallel to the brush and close thereto for laying back the hair of skins while the dye material is being applied by the brush, and means for heating and drying the carrier surface before returning to position under the brush.

7. In dyeing apparatus, the combination of a drying chamber, an endless belt carrier guided through the chamber and guided to a point outside the same, a rotating dye applying brush arranged transversely of the carrier outside of the drying chamber, means for supplying the brush with a dye material whereby it may be applied to skins conveyed by the carrier under the brush, a second brush for distributing the applied dye on the article interposed between the dye applying brush and the drying chamber, and means for heating and drying the carrier surface before returning to position under the brush.

8. In dyeing apparatus, the combination of a drying chamber, an endless belt carrier guided through the chamber and guided to a point outside the same, a rotating dye applying brush arranged transversely of the carrier outside of the drying chamber, means for supplying the brush with a dye material whereby it may be applied to skins conveyed by the carrier under the brush, a drag roll parallel to the brush and close thereto for laying back the hair of skins while the dye material is being applied by the brush, a second brush for distributing the applied dye on the article interposed between the dye applying brush and the drying chamber, a second drag roll interposed between the two brushes for laying back the dyed fur to enable the second or finishing brush to act upon the sides of the hair above the surface of the skin, and means for heating and drying the carrier surface before returning to position under the brush.

9. In dyeing apparatus, the combination of a drying chamber, an endless belt carrier guided through the chamber and guided to a point outside the same, means for putting the endless carrier under tension, a rotating dye applying brush arranged transversely of the carrier outside of the drying chamber, means for supplying the brush with a dye material whereby it may be applied to skins conveyed by the carrier under the brush, and means for heating and drying the carrier surface before returning to position under the brush.

10. In dyeing apparatus, the combination of a drying chamber, an endless belt carrier guided through the chamber and guided to a point outside the same, a rotating dye applying brush arranged transversely of the carrier outside of the drying chamber, means for supplying the brush with a dye material whereby it may be applied to skins conveyed by the carrier under the brush, means for heating and drying the carrier surface before returning to position under the brush, and means for exhausting the drying chamber of moisture.

11. In dyeing apparatus, the combination of a drying chamber, an endless belt carrier guided through the chamber and guided to a point outside the same, a rotating dye applying brush arranged transversely of the carrier outside of the drying chamber, means for supplying the brush with a dye material whereby it may be applied to skins conveyed by the carrier under the brush, a drag roll parallel to the brush and close thereto for laying back the hair of skins while the dye material is being applied by the brush, a second brush for distributing the applied dye on the article interposed between the dye applying brush and drying chamber, a second drag roll interposed between the two brushes for laying back the dyed fur to enable the second or finishing brush to act upon the sides of the hair above the surface of the skin, means for heating and drying the carrier surface before returning to position under the brush, and means for exhausting the moist air from the drying chamber and admitting fresh air thereto.

12. In dyeing apparatus, the combination of a heated drying chamber, an endless belt carrier passing through said chamber and to an exposed position outside thereof, guides for the sides of the carrier within the chamber, brush devices for applying dye material to skins upon the carrier at its exposed position outside of the chamber, means to apply dye material to the brush devices, and power means for propelling the carrier and rotating the brush devices.

13. In dyeing apparatus, the combination of a heated drying chamber, an endless belt carrier passing through said chamber and to an exposed position outside thereof, guides for the sides of the carrier within the chamber, brush devices for applying dye material to skins upon the carrier at its exposed position outside of the chamber, exhausting devices for withdrawing the moist air from the chamber and admitting fresh air thereto, means to apply dye material to the brush devices, and power means for propelling the carrier and rotating the brush devices.

14. In dyeing apparatus, the combination of a carrier for conveying the skins, a rotary dye applying brush arranged close to the carrier, means to supply dye to the brush, and means to regulate the supply of the dye supplied.

15. In dyeing apparatus, the combination of a carrier for conveying the skins, a rotary dye applying brush arranged close to the carrier, means to supply dye to the brush, means to regulate the supply of dye supplied, and means to put a drag upon the hair of the skins to expose the sides of the hair to the brush.

16. In dyeing apparatus, the combination of a carrier for conveying the skins, a rotary dye applying brush arranged close to the carrier, means to supply dye to the brush, means to regulate the supply of dye supplied, and means for adjusting the brush and carrier relatively nearer or farther apart.

17. In dyeing apparatus, the combination with a carrier for conveying the skins, of a plurality of rotary brushes arranged to brush the fur of the skins being conveyed by the carrier, means for supplying dye, and means for regulating the supply of dye.

18. In dyeing apparatus, the combination with a carrier for conveying the skins, of a plurality of rotary brushes arranged to brush the fur of the skins being conveyed by the carrier, means for supplying dye, means for adjusting the brushes and carrier relatively nearer together or farther apart, and means for regulating the supply of dye.

19. The hereindescribed method of dyeing fur, which consists in passing a skin along a prescribed path with the fur exposed, and engaging said fur with a dyeing member in fixed position out of reach of the body of the skin.

20. The hereindescribed method of dyeing fur, which consists in passing a skin along a prescribed path with the fur exposed, and engaging said fur with a dye brush in fixed position out of reach of the body of the skin.

21. The herein described method of dyeing fur, which consists in passing a skin along a prescribed path with the fur exposed, engaging said fur with a dyeing member out of reach of the body of the skin, and rubbing said dye into the fur with a brush also out of reach of the body of the skin.

22. The hereindescribed method of dyeing fur, which consists in passing a skin over a supporting surface with the fur exposed, and engaging said fur with a dyeing member in fixed position out of reach of the body of the skin.

23. The herein described method of dyeing fur, which consists in passing a skin over a supporting surface with the fur exposed, engaging said fur with a dyeing member out of reach of the body of the skin, and rubbing said dye into the fur with a brush also out of reach of the body of the skin.

24. In a dyeing machine, the combination of means for passing a skin along a prescribed path, with the fur exposed, a dyeing member for applying dye to the fur at a distance from the body of the skin, and a rubbing-in brush adjacent said dyeing member in such position as to engage the fur without engaging the body of the skin.

25. In a dyeing machine, the combination of means for passing a skin along a prescribed path with the fur exposed, a dye brush for applying dye to the fur, and another brush adjacent said dye brush for rubbing the dye into the fur, both said brushes being adjacent the path of the skin in such position as to engage said fur without engaging the body of the skin.

26. In a dyeing machine, the combination with a supporting surface and means for passing a skin over said surface with the fur outward, of a dye brush adjacent said surface for supplying dye to the fur, and another brush adjacent said dye brush for rubbing the dye into the fur, both of said brushes being adjacent said surface in such position as to engage said fur without engaging the body of the skin.

27. In a fur dyeing machine, the combination of means for passing a skin along a prescribed path with the fur exposed, means for bending over the fur, and a dyeing member in such position as to engage said bent-over fur without engaging the body of the skin.

28. In a fur dyeing machine, the combination of means for passing a skin along a prescribed path with the fur exposed, means for bending over the fur, and a dyeing brush in such position as to engage said bent-over fur without engaging the body of the skin.

29. In a dyeing machine, the combination with a supporting surface and means for passing a skin over said surface with the fur outward, of means for bending over the fur, a brush adjacent said surface in such position as to engage said bent-over fur without engaging the body of the skin, and means for supplying dye to said brush.

30. In a dyeing machine, the combination with a carrier adapted to support a skin with the fur outward, of means for bending over the fur, and a dyeing brush adjacent said carrier in such position as to engage said bent-over fur without engaging the body of the skin.

31. The hereindescribed method of dyeing fur skins, which consists in passing them along a prescribed path, engaging the fur with successive brushes out of reach of the body of the skin, and supplying dye to the first of said brushes.

32. In a dyeing machine, the combination with a supporting surface and means for passing a skin over said surface with the fur outward, of successive brushes spaced from said surface so as to engage the fur without engaging the body of the skin, and means for supplying dye to the first of said brushes.

33. In a fur dyeing machine, the combination of means for passing a skin along a prescribed path with the fur exposed, successive brushes spaced from said path so as to engage the fur without engaging the body of the skin, and means for supplying dye to the first of said brushes.

HARRY C. LUBARSKY.

Copies of this patent may be obtained for five cents each, by addressing the "Commissioner of Patents Washington, D. C."